United States Patent
Bastard et al.

(10) Patent No.: US 7,234,492 B2
(45) Date of Patent: Jun. 26, 2007

(54) DOUBLE-SHEATH PIPE FOR TRANSPORTING FLUIDS, PROVIDED WITH A DEVICE FOR LIMITING PROPAGATION OF A BUCKLE OF THE OUTER TUBE AND METHOD FOR LIMITING PROPAGATION

(75) Inventors: Antoine Bastard, Thiberville (FR); Mike Bell, Aberdeen (GB)

(73) Assignee: Coflexip (FR)

( * ) Notice: Subject to any disclaimer, the term of this patent is extended or adjusted under 35 U.S.C. 154(b) by 398 days.

(21) Appl. No.: 10/399,458

(22) PCT Filed: Sep. 20, 2001

(86) PCT No.: PCT/FR01/02929

§ 371 (c)(1),
(2), (4) Date: Apr. 15, 2003

(87) PCT Pub. No.: WO02/33301

PCT Pub. Date: Apr. 25, 2002

(65) Prior Publication Data

US 2004/0091321 A1    May 13, 2004

(30) Foreign Application Priority Data

Oct. 19, 2000  (FR) .................................. 00 13397

(51) Int. Cl.
*F16L 9/00* (2006.01)
(52) U.S. Cl. ...................... 138/114; 138/112; 138/113; 138/172; 138/148; 405/168.2
(58) Field of Classification Search ................ 138/114, 138/113, 112, 172, 148, 108; 405/168.2, 405/168.3
See application file for complete search history.

(56) References Cited

U.S. PATENT DOCUMENTS

| 3,747,356 | A |   | 7/1973  | Lochridge et al. ............ 61/72.3 |
| 3,768,209 | A |   | 10/1973 | Punter et al. ..................... 51/9 |
| 4,364,629 | A |   | 12/1982 | Lang et al. ................. 359/377 |
| 4,364,692 | A |   | 12/1982 | Kyriakides et al. ......... 405/168 |
| 5,433,252 | A |   | 7/1995  | Wolf et al. .................. 138/113 |
| 5,458,441 | A |   | 10/1995 | Barry ......................... 405/170 |
| 5,803,127 | A | * | 9/1998  | Rains .......................... 138/113 |
| 5,821,452 | A | * | 10/1998 | Neuroth et al. ............... 174/28 |
| 6,143,988 | A | * | 11/2000 | Neuroth et al. ......... 174/105 R |
| 6,167,915 | B1 | * | 1/2001 | Collie et al. ................. 138/114 |
| 6,651,700 | B1 | * | 11/2003 | Bastard et al. .............. 138/172 |

FOREIGN PATENT DOCUMENTS

| FR | 2795806 | 1/2001 |
| FR | 2795807 | 1/2001 |
| FR | 2804197 | 7/2001 |
| GB | 1383527 | 2/1975 |

* cited by examiner

*Primary Examiner*—Patrick Brinson
(74) *Attorney, Agent, or Firm*—Ostrolenk, Faber, Gerb & Soffen, LLP

(57) ABSTRACT

The invention concerns a double-sheath rigid pipe for transporting hydrocarbons consisting of two respectively inner (2) and outer (3) coaxial tubes separated by an annular gap (5), said pipe being adapted to be wound and comprising a device limiting the propagation of a deformation occurring on the outer tube, wherein a radial stop device (10) linked to the inner tube (2) but not linked to the outer tube (3) allows a localized collapse of value G of the outer tube, G being selected to stop the propagation of a deformation of the outer tube (3).

15 Claims, 3 Drawing Sheets

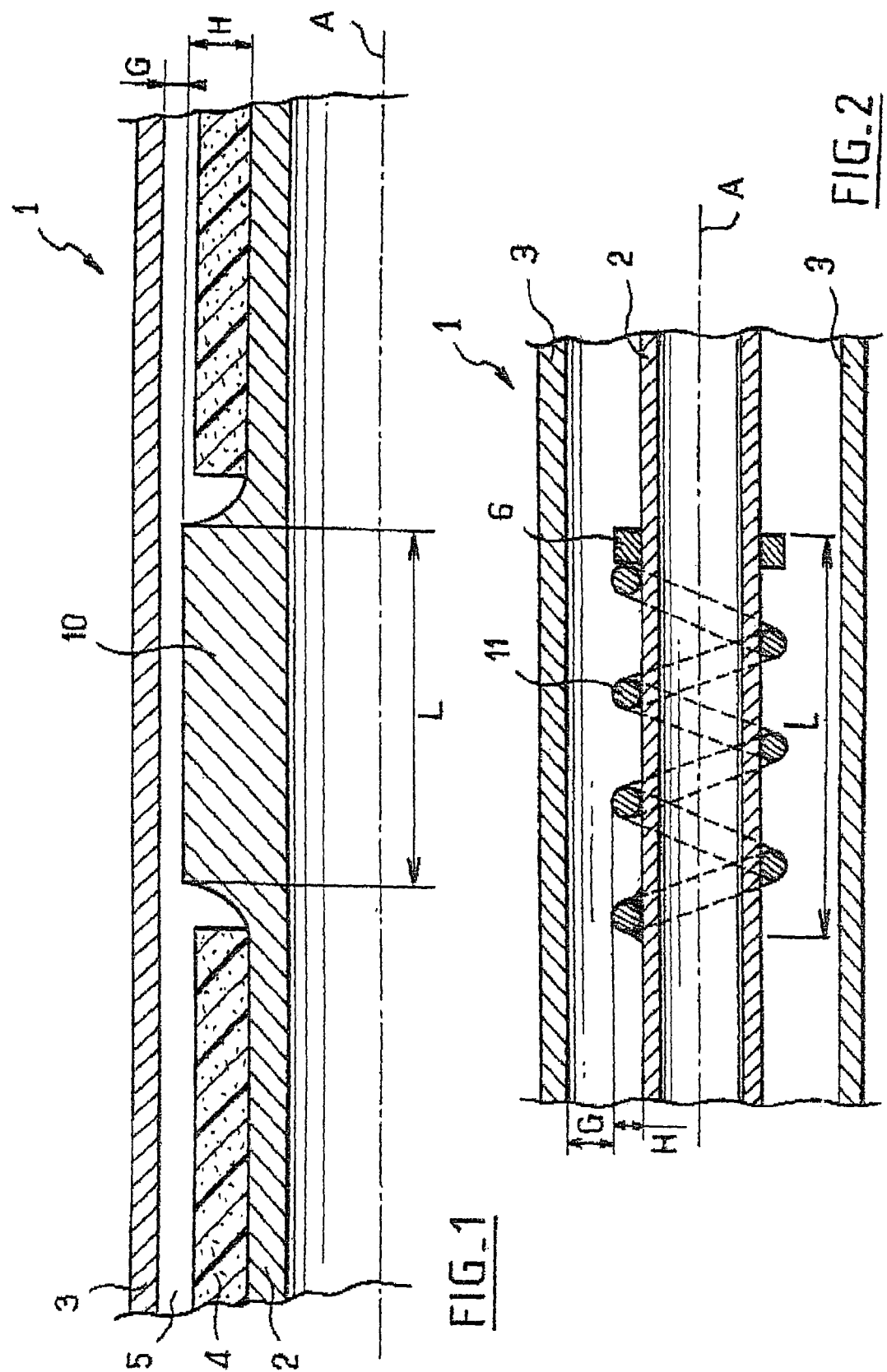

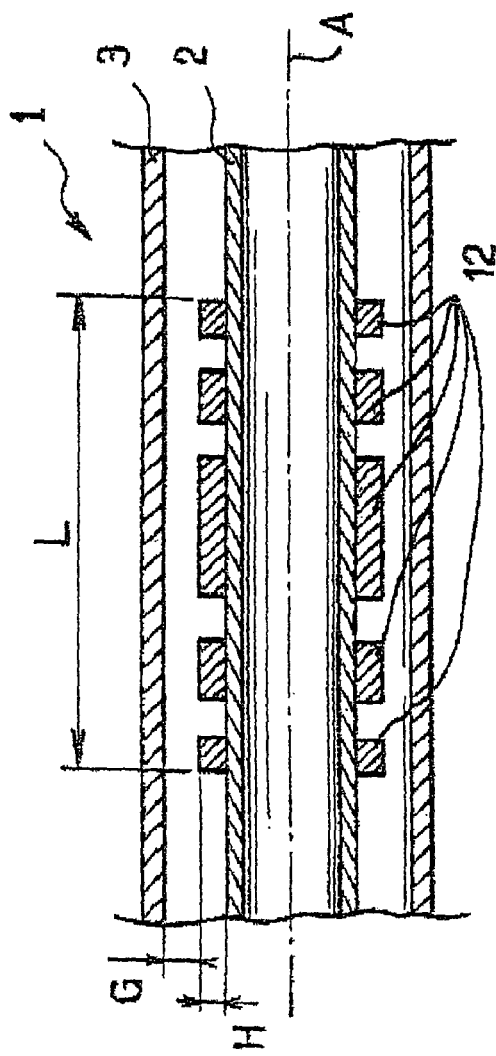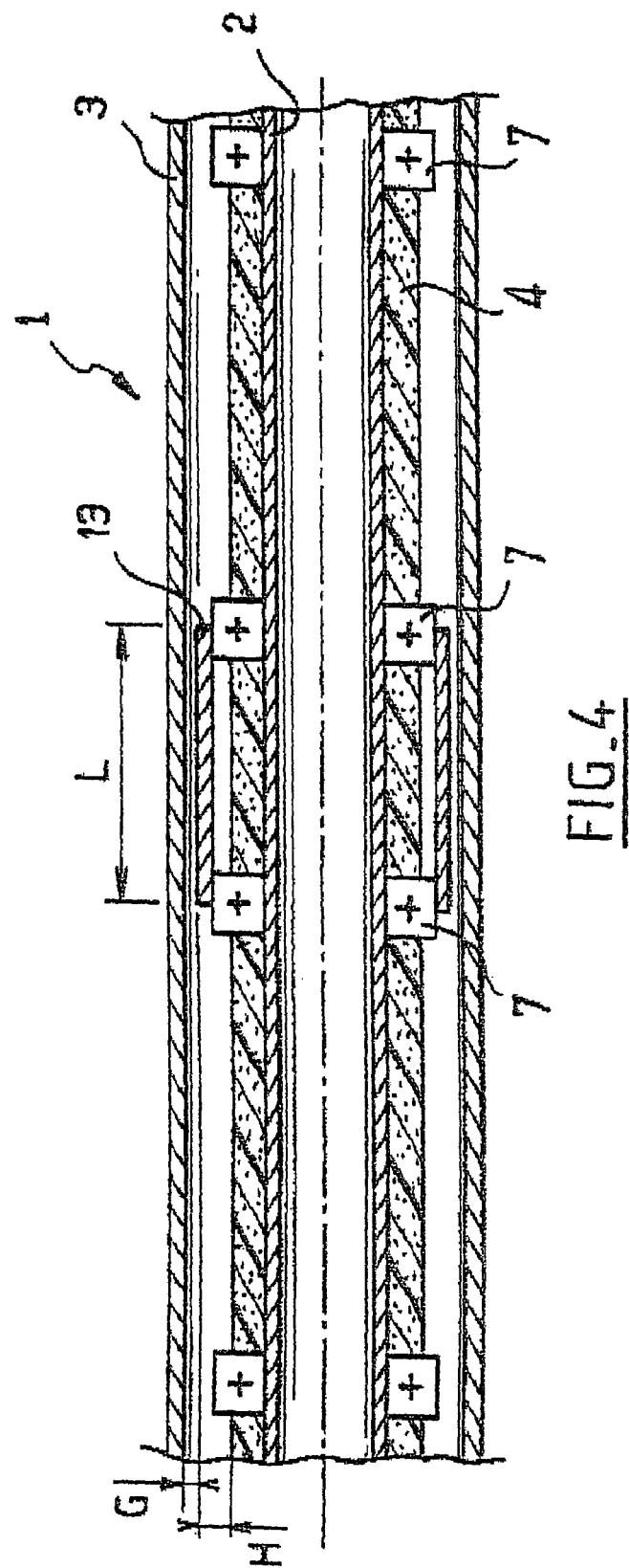

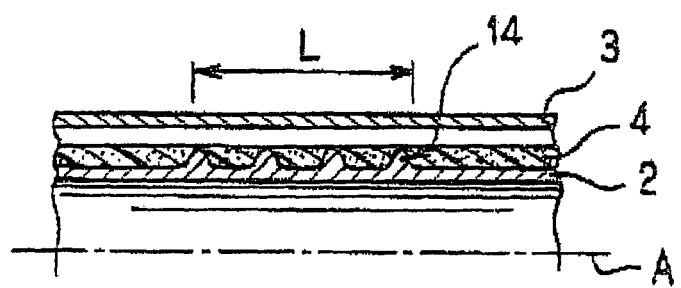
FIG.5
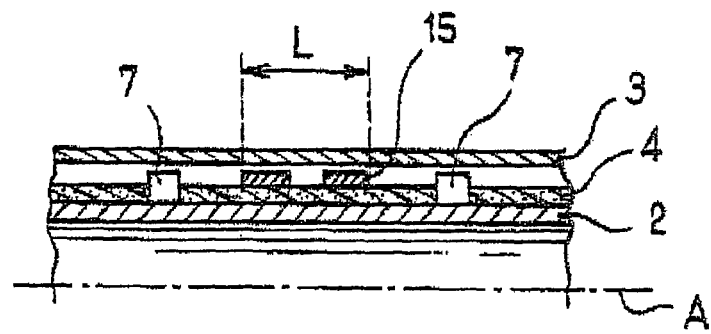
FIG.6
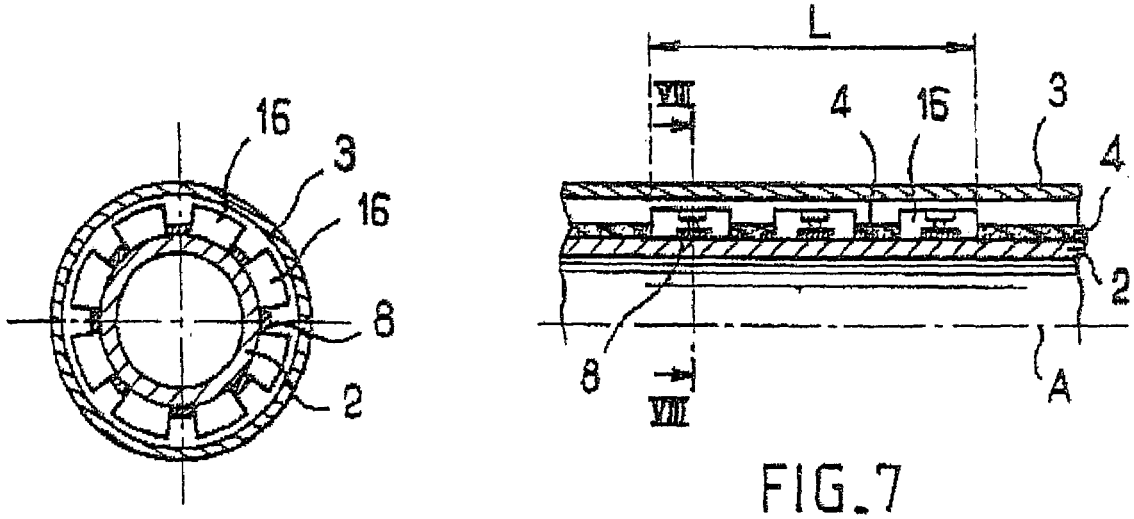
FIG.8
FIG.7

DOUBLE-SHEATH PIPE FOR TRANSPORTING FLUIDS, PROVIDED WITH A DEVICE FOR LIMITING PROPAGATION OF A BUCKLE OF THE OUTER TUBE AND METHOD FOR LIMITING PROPAGATION

BACKGROUND OF THE INVENTION

The present invention relates to a device and to a method for limiting or arresting the propagation of a buckle in a double-walled (or double-sheath) pipe consisting of two, respectively inner and outer, coaxial tubes separated by an annular space, this pipe being a rigid pipe for transporting fluids such as hydrocarbons, and designed to be submerged.

A rigid pipe or tube is laid on the seabed usually from a vessel called a pipelaying barge. The laying is called S-laying when the pipe adopts the shape of an S between the pipelaying barge and the seabed and it is called J-laying when the pipe adopts the shape of a J. In the latter case, a guide ramp is provided on the pipelaying barge, which ramp may sometimes be partially immersed in the water.

The rigid pipe to be laid is stored on the pipelaying barge either in pipe sections of a given but relatively short length, the pipe sections being joined together as the laying progresses, or it is made as a very long pipe on land and then wound onto a storage reel located on the pipelaying barge, the pipe then being unwound from the said reel during the laying operation. These laying operations are described in the API (American Petroleum Institute) document "Recommended Practice 17 A" from 1987.

When the pipe has left the barge and while the said pipe is being laid, it is important for the latter not to undergo plastic deformation in bending, which would result in ovalization of the pipe, the said ovalization causing a "weak singularity" which would be conducive to the initiation of a collapse. Moreover, when the pipe is laid on the seabed at great water depths (typically greater than 300 m and possibly down to 2000 m and more), the hydrostatic pressure exerted on the pipe may be sufficient to initiate a radial buckle which has a tendency to propagate along the pipe, in both directions. Of course, the buckle will form preferentially at a "weak singularity" when one exists on the pipe. When the buckle occurs, it is then necessary to replace at least that section or portion of the pipe comprising the buckled or collapsed region. The buckle propagation pressure is given by the formula:

$$A \times \sigma_0 \times (T/D)^\beta$$

where $\sigma_0$ is the yield stress of the steel, T is the thickness of the pipe and D is the external diameter of the pipe and where the parameters A and $\beta$ are given by the American recommendations API RP 1111 (namely, A=24, $\beta$=2.4) or Norwegian recommendations DNV OS/F100 (namely, A=26.7, $\beta$=2.5). To resist the propagation of a buckle, the corresponding pressure must be greater than the hydrostatic pressure.

To avoid this problem, it is possible to increase the thickness of the pipe so as to have a propagation pressure greater than the hydrostatic pressure, but this results in a considerable increase in both the cost and the weight of the pipe, most particularly in the case of double-walled rigid pipes.

To prevent the propagation of a local buckle or local buckles, it has also been proposed to provide the pipe with certain devices or means, called buckle arrestors. The API Recommended Practice 1111 gives various recommendations and formulae which indicate above which depth the arrestors are recommended, necessary or strictly indispensable. Such devices were firstly proposed within the context of single-walled rigid pipes.

The arrestor may be movable, as described in the document U.S. Pat. No. 3,747,356. According to that document it is proposed to link a cylinder to a cable, to lodge the cylinder inside a pipe section and then to simultaneously unreel the pipe and the cable so as to keep the cylinder in the pipe section while the latter is being laid, until the pipe comes into contact with the seabed. The cylinder is then brought back up so as to be lodged in another pipe section to be laid, which is joined to the previous section. Consequently, any buckle likely to occur, when laying the pipe, between the pipelaying barge and the seabed is immediately arrested and is therefore not allowed to propagate along the pipe sections. However, such an arrangement provides no solution or effectiveness for arresting buckles likely to be propagated after the pipe has been finally laid on the seabed.

This is why fixed arrestors have been proposed, these being positioned in places along the pipe. The distance separating two arrestors is defined according to the cost of these devices compared with the cost of replacing the crushed section between two devices. In general, these devices are positioned along the rigid pipe every 100 to 300 m. These devices, by locally increasing the inertia of the pipe, make it possible to arrest the propagation of a buckle.

According to a first solution, an inner, or preferably outer, reinforcing collar (possibly in two parts, constituting a "clamp") is used. Thus, in U.S. Pat. No. 3,768,269, it is proposed that the stiffness of the pipe be increased locally by placing, at regular intervals, reinforcing collars whose length ranges between 1 m and 2.5 m. Such a solution is valid only for pipes laid in sections since the reinforcing collars can be mounted and fastened to the pipe sections in the factory and then transported by the pipelaying barge to the laying site. When the pipe is long and wound onto a storage reel, it then becomes virtually impossible to wind the pipe with its reinforcing collars onto a reel since they would result in straight or almost straight portions that cannot be deformed when winding the pipe onto the storage reel. To mitigate this difficulty, it is conceivable to mount and fasten the reinforcing collars during the laying operations. However, it would then be necessary to interrupt the laying, at regular intervals, so as to mount and fasten the reinforcing collars. According to an alternative solution known through this same patent or through documents GB 1 383 527 or U.S. Pat. No. 5,458, 441, the localized reinforcement may take the form of a thicker intermediate sleeve welded to the ends of the pipe.

According to a second solution, a spiralled rod is used on the external wall of the pipe. Thus, to allow the pipe to be wound onto a reel, U.S. Pat. No. 4,364,692 proposes to wind a rod tightly around the pipe so as to form a certain number of turns which can be welded at their ends to the rod itself and/or to the pipe.

According to another embodiment, the turns may be individual turns, by welding their two ends and by regularly spacing them apart along that portion of the pipe to be reinforced.

As long as the pipe is a single-walled pipe, the increase in the diameter in the reinforced portions may be acceptable. However, when the pipe is of the double-walled or pipe-in-pipe type, that is to say one comprising an outer tube or carrier pipe into which the inner tube or flowline is inserted, the increase in the diameter of the outer tube is unacceptable when transporting and storing long lengths of double-walled pipe when the pipe is laid by the "unreeled rigid pipe" method.

In addition, when the rigid pipe to be laid is manufactured in long lengths on land and then wound onto a reel on the pipelaying barge, the solutions recommended in the aforementioned documents are not appropriate as they use either long reinforcing collars, having a length of about 1 to 2.5 m, as in U.S. Pat. No. 3,768,209, or the winding of a reinforcing rod around the rigid pipe, as in U.S. Pat. No. 4,364,692.

In the case of double-walled pipes, the arrestor device generally consists of a collar mounted on the outer tube of the pipe. When the pipe is laid using a barge for laying an unreeled rigid pipe, this device must be mounted progressively with the laying operation (it is not reelable), thereby considerably increasing the cost of laying.

For the purpose of solving these problems and of obtaining double-walled pipes that can be wound, despite the propagation arrestors, the Applicant has already proposed particular devices.

According to Application FR 99/08540, a portion of flexible pipe or spring is welded to the internal wall of the outer tube in order locally to increase the inertia of the outer tube and form a flexible propagation arrestor which is reelable.

According to Application FR 99/15216, the propagation arrestor consists of an annular compartment filled with resin which is injected before or during the laying and which can be cured only after the laying if the length of the compartment for the resin is too great to allow winding in the cured state. The compartment serves to transfer the loads on the outer tube to the inner tube.

According to Application FR 00/00849, the arrestor consists of a steel partition which, as in the previous solution, transfers the loads from the outer tube to the inner tube.

All these buckle propagation arrestor devices therefore consist in reinforcing the outer tube, which may be subjected to this propagation, thereby directly or indirectly increasing the inertia of the outer tube.

The devices developed by the Applicant give very good results and are effective down to depths of the order of 2500 m. In some applications, when the depth is smaller, these devices may represent an excessive cost compared with the actual requirements.

SUMMARY OF THE INVENTION

It is an objective of the invention to provide a propagation arrestor device for a reelable double-walled pipe which is very simple to manufacture and to mount, and is effective even at great water depths.

The objective of the invention is achieved by means of a method of limiting the propagation of a buckle appearing on an outer tube of a double-walled rigid pipe for transporting hydrocarbons, which consists of two coaxial tubes, the inner tube and the outer tube respectively, separated by an annular space, this pipe being of the reelable type, characterized in that the maximum deformation that the outer tube may have, without the said buckle propagating due to the effect of the hydrostatic pressure, is determined and a device linked to the inner tube and not linked to the outer tube is inserted into the annular space between the two tubes so as to limit the deformation of the outer tube to below this maximum deformation. Thus, the invention runs counter to the known devices; instead of reinforcing the outer tube so as to prevent it from deforming, it is not reinforced but the deformation that it can withstand is given a maximum value, this maximum value being determined by calculation or by experiment, depending on the hydrostatic pressure and on the characteristics of the outer tube.

The invention also relates to the pipe employing the method of the invention, namely a double-walled rigid pipe for transporting hydrocarbons, consisting of two coaxial tubes, the inner tube and the outer tube respectively, separated by an annular space, this pipe being of the reelable type and including a device for limiting the propagation of a buckle appearing on the outer tube, characterized in that the said device consists of a radial stop device linked to the inner tube, allowing a localized collapse of value G of the outer tube, G being chosen to arrest the propagation of a buckle of the outer tube.

In practice, G is determined in conjunction with the length L of the device. This is because the propagation arrestor device forces the deformation of the outer tube (its ovalization) to "reform" to a larger diameter, and therefore to go from a relatively elongate elliptical cross section to a less elongate elliptical cross section with the same perimeter, this cross section corresponding to a buckle propagation pressure greater than the hydrostatic pressure. However, to arrest the propagation of the buckle, the device must be long enough to dissipate the propagation energy. This length must in particular be long enough for the "reforming" of the flattened ellipse in the arrestor device not to induce, by a simple geometry effect, a new deformation into a flattened ellipse on the other side of the device, lying at right angles with respect to the first ellipse, which new deformation could again propagate.

Although the values of G and L to be used therefore depend entirely on the case in point, namely the geometrical and physical characteristics of the double-walled pipe and the ambient hydrostatic pressure for which it is designed, an empirical rule is to provide a device with a length of between 0.3 and 5 times, preferably between 0.5 and 3 times, the outside diameter of the outer tube and a radial thickness of between 0.1 and 0.9 times, preferably between 0.3 and 0.8 times, the thickness of the annular space. However, it will be understood that the longer the length, the smaller the thickness may be, and vice versa.

The invention applies especially to double pipes provided with spacers. The spacers are the spacing rings which centre, uniformly along the pipe, the inner tube coated with the layer of thermal insulation so as to prevent the said thermal insulation coming in contact with the outer tube. These spacers are usually placed every 2.5 m. Their height is generally about 70% to 80% of the thickness of the annular space and their length is less than 100 mm in order to limit heat losses. They are generally made of plastic, for example nylon. Although the thickness of the spacers may in some cases be compatible with a value corresponding to propagation arrest, in practice they are not used for this purpose because, on the one hand, their length is too short to dissipate the propagation energy and, on the other hand, they tend to creep over time and under load.

In one embodiment, the said device is a continuous or discontinuous section of the inner tube with an increased thickness.

In another embodiment, the said device is a spring fastened to the inner tube.

In another embodiment, the said device consists of a succession of rings fixed to the inner tube.

In another embodiment, the said device consists of a sleeve placed over the thermal insulation between two spacers.

In another embodiment, the said device consists of collars placed loosely around the layer of thermal insulation.

In another embodiment, the said device consists of studs held together by flexible bands.

In all the embodiments, the device is made of a strong material not liable to creep, for example epoxy resin or steel.

BRIEF DESCRIPTION OF THE DRAWINGS

Further advantages and features will become more apparent on reading the following description of the invention, with reference to the appended drawings in which:

FIG. 1 is a longitudinal sectional view of part of a double-walled rigid section equipped with a first embodiment of the propagation arrestor device according to the invention;

FIG. 2 is a longitudinal sectional view of part of a double-walled rigid section equipped with a second embodiment of the propagation arrestor device according to the invention;

FIG. 3 is a longitudinal sectional view of part of a double-walled rigid section equipped with a third embodiment of the propagation arrestor device according to the invention;

FIG. 4 is a longitudinal sectional view of part of a double-walled rigid section equipped with a fourth embodiment of the propagation arrestor device according to the invention;

FIG. 5 is a longitudinal sectional view of part of a double-walled rigid section equipped with a fifth embodiment of the propagation arrestor device according to the invention;

FIG. 6 is a longitudinal sectional view of part of a double-walled rigid section equipped with a sixth embodiment of the propagation arrestor device according to the invention;

FIG. 7 is a longitudinal sectional view of part of a double-walled rigid section equipped with a seventh embodiment of the propagation arrestor device according to the invention;

FIG. 8 is a cross-sectional view on VIII—VIII of the device in FIG. 7.

DETAILED DESCRIPTION OF PREFERRED EMBODIMENTS

The double-walled rigid pipe 1 of longitudinal axis A, shown partially in FIG. 1, comprises an inner wall or tube 2 (the "flowline"), the diameter and the nature of the material of which are chosen according to the fluid flowing in the said inner tube, especially according to the temperature and pressure of the said fluid, and an outer wall or tube 3 (the "carrier pipe") which is slipped over the inner tube 2. The outer tube 3 has an outside diameter which is oversized with respect to the inner tube 2 in order to allow a thermal insulation to be placed in the annular space 5 and has a thickness which makes it possible to withstand the hydrostatic pressure which is exerted on the said outer tube 3.

According to the invention, the inner tube 2 comprises a cylindrical section 10 of length L with a thickness increased towards the outside by an amount H, leaving a distance G to the outer tube. G is, by calculation or by experiment, greater than the value above which a buckle of the outer tube 3 propagates under the hydrostatic pressure, and the length L is sufficient to arrest the propagation of a buckle.

Calculations were made on a pipe structure whose inner tube measured 10 inches (273.1 mm) for a thickness of 12.7 mm and whose inner tube measured 6 inches (168.3 mm) for a thickness of 18.3 mm, with an annular space 40 mm in thickness. The buckle propagation pressure without a device was 11 MPa (110 bar, corresponding to a water depth of approximately 1100 m). When the device has a thickness of 20 mm (0.5 times the thickness of the annular space), the propagation pressure is 16.5 MPa (165 bar, i.e. approximately 1600 m). When the device has a thickness of 32 mm (0.8 times the thickness of the annular space), the propagation pressure is 26 Mpa (260 bar, i.e. approximately 2500 m).

A test was carried out with a double-walled pipe identical to that for the calculations, forming a propagation arrestor device having a thickness of 32 mm and a length of 100 mm. A buckle was initiated on the outer tube under an external pressure of 150 bar (corresponding to the hydrostatic pressure existing at a depth of 1500 m): the buckle was properly arrested by the device. It will be understood that if the device had had a thickness of 20 mm, the length of this device would have had to be greater so as to dissipate the propagation energy (the propagation pressure in this case being higher, but close to the external pressure). In contrast, if the device had a smaller thickness, (close to the outside diameter of the inner tube), the buckle would not have been arrested, the propagation pressure in this case being less than the external pressure.

Other illustrative examples of the arrestor devices will now be described.

FIG. 2 shows an arrestor device 11 consisting of a spring wound with a tight pitch around the inner tube and welded to it or prevented from moving translationally by one or two stops, such as the welded ring 6. Using a spring of this type does not increase the rigidity of the inner tube.

In FIG. 3, the arrestor device 12 consists of a succession of steel rings which are fixed to the inner tube and have a width decreasing from the centre of the device out towards its ends, so as to reduce the stresses on the inner tube during reeling. Alternatively, the rings may be made of epoxy resin so as to limit the thermal losses at the device. The rings could also be of the same length.

In FIG. 4, which shows the insulation 4 and the spacers 7, the arrestor device consists of a sleeve 13 placed between two spacers 7 over the thermal insulation 4 and fixed to the spacers. This device is particularly beneficial as it does not interfere with the thermal insulation. If necessary, the space separating the spacers may be tailored to the length L of the arrestor device.

In FIG. 5, the device 14 is similar to the device in FIG. 1, except that the additional thickness is discontinuous (in cross section) instead of being continuous, and it may be made in the form of a succession of rings or in the form of a helix. Each ring or helix may be formed from a succession of discrete additional thicknesses.

In FIG. 6, the device 15 consists of two steel collars placed loosely around the layer of thermal insulation 4.

In FIGS. 7 and 8, the device 16 consists of several circles of studs circumferentially connected together by a flexible band 8. The thermal insulation 4 is interposed between these circles.

The invention claimed is:

1. A plural tube rigid pipe for fluid transmission wherein the pipe being intended to be immersed and subjected to hydrostatic pressure, the pipe including coaxial inner and outer tubes, with the tubes being shaped and positioned to define an annular space between the inner and outer tubes, the inner tube having an inner hollow space to allow fluid to flow therethrough;

the rigid pipe and the tubes thereof are of types to enable the pipe to be reelable;

a buckle propagation limiting device for limiting propagation of a buckle occurring in the outer tube, the device comprising a radial stop device linked to the inner tube and not linked to the outer tube, wherein the radial stop device is shaped and positioned as to permit a localized collapse of the outer tube, but the value of the permitted localized collapse is chosen to arrest the propagation of a buckle of the outer tube, and the buckle propagation limiting device is of a type to enable the pipe to be reelable.

2. The pipe of claim 1, wherein the pipe is of a material for transporting hydrocarbons.

3. The device of claim 1, wherein the device has a length along the pipe of between 0.3 and 5 times the diameter of the outer tube, and the device has a thickness in the radial direction of between 0.1 and 0.9 times the thickness in the radial direction of the annular space.

4. The pipe of claim 1, wherein the device has a length of between 0.5 and 3 times the diameter of the outer tube.

5. The pipe of claim 1, wherein the device has a thickness of between 0.1 and 0.8 times the thickness of the annular space.

6. The pipe of claim 1, wherein the device is a continuous section of the inner tube and having an increased thickness with respect to the thickness of the inner tube.

7. The pipe of claim 1, wherein the device is comprised of a strong material not liable to creep.

8. The pipe of claim 7, wherein the device is comprised of an epoxy resin.

9. The pipe of claim 7, wherein the device is comprised of steel.

10. The pipe of claim 1, wherein the device is a discontinuous section of the inner tube and having an increased thickness with respect to the thickness of the inner tube.

11. The pipe of claim 1, wherein the device comprises a spring fastened to the inner tube.

12. The pipe of claim 1, wherein the device comprises a succession of rings around and fixed to the inner tube.

13. The pipe of claim 1, further comprising spacers disposed at spaced locations along the pipe in the annular space;

thermal insulation around the inner tube and between the spacers;

the device comprising a sleeve placed over the thermal insulation and between neighboring ones of the spacers along the pipe.

14. The pipe of claim 1, further comprising a layer of thermal insulation around the inner tube;

the device comprising a plurality of collars loosely placed around the layer of thermal insulation.

15. The pipe of claim 1, wherein the device comprises studs in the annular space and flexible bands holding the studs together.

* * * * *